(12) United States Patent
Numoto et al.

(10) Patent No.: US 7,988,192 B2
(45) Date of Patent: Aug. 2, 2011

(54) GAS GENERATOR

(75) Inventors: Kenji Numoto, Hyogo (JP); Yasunori Iwai, Hyogo (JP)

(73) Assignee: Daicel Chemical Industries, Ltd., Osaka-Shi (JP)

( * ) Notice: Subject to any disclaimer, the term of this patent is extended or adjusted under 35 U.S.C. 154(b) by 273 days.

(21) Appl. No.: 12/289,954

(22) Filed: Nov. 7, 2008

(65) Prior Publication Data

US 2009/0121464 A1    May 14, 2009

Related U.S. Application Data

(60) Provisional application No. 60/988,322, filed on Nov. 15, 2007.

(30) Foreign Application Priority Data

Nov. 12, 2007    (JP) ................................ 2007-292718

(51) Int. Cl.
     *B60R 21/26*    (2006.01)
(52) U.S. Cl. ....................................... 280/741
(58) Field of Classification Search .................. 280/741, 280/736; 102/530, 531
See application file for complete search history.

(56) References Cited

U.S. PATENT DOCUMENTS

| | | | |
|---|---|---|---|
| 5,772,243 A | 6/1998 | Green et al. | |
| 7,404,574 B2 * | 7/2008 | Hirooka et al. | 280/741 |
| 2005/0200107 A1 | 9/2005 | Matsuda et al. | |

FOREIGN PATENT DOCUMENTS

| | | |
|---|---|---|
| DE | 40 05 768 A1 | 8/1991 |
| DE | 10 2004 060 838 A1 | 7/2005 |
| EP | 1 659 036 A1 | 5/2006 |
| JP | 6-227357 A | 8/1994 |
| JP | 9-226508 A | 9/1997 |
| JP | 2005-199867 A | 7/2005 |
| WO | WO 03/072381 A2 | 9/2003 |

\* cited by examiner

*Primary Examiner* — Eric Culbreth
(74) *Attorney, Agent, or Firm* — Birch, Stewart, Kolasch & Birch, LP

(57) ABSTRACT

A gas generator includes,
     a cylindrical housing having a port and closed at both ends,
     an ignition device attached to one end of the housing,
     a first chamber provided in the housing at a position close to the ignition device and filled with a first agent,
     a cylindrical filter provided in a space adjacent to the first chamber,
     a second chamber provided inside the filter and filled with a second agent, and
     a retainer disposed between the first and second chambers, the retainer having an annular flat surface and an annular circumferential wall surface that protrudes from an inner circumferential edge of the annular flat surface, the annular flat surface abutting one end of the filter and the annular circumferential wall surface abutting a portion of an inner circumferential surface of the filter,
     an inner diameter of the second chamber being smaller than that of the first chamber.

10 Claims, 4 Drawing Sheets

GAS GENERATOR

This nonprovisional application claims priority under 35 U.S.C. §119(a) on Patent Application No. 2007-292718 filed in Japan on 12 Nov. 2007 and 35 U.S.C. §119(e) on U.S. Provisional Application No. 60/988,322 filed on 15 Nov. 2007, which are incorporated by reference.

BACKGROUND OF INVENTION

1. Field of Invention

The present invention relates to a gas generator for use in a restraining device such as an airbag system installed on an automobile.

2. Description of the Related Art

An airbag system that protects an occupant from a collision impact is known as a restraining device installed on a vehicle. The airbag system uses a gas generator that inflates an airbag, and the shape and structure of the gas generator itself are known to have various specifications depending on whether the airbag system is designed for a driver side, a passenger side, or side collision.

Because of a large space between windshield or dashboard and a passenger, the volume of an inflated bag for the passenger side is larger than that of the airbag for the driver side, and has a capacity of 120 L or 150 L. Further, because the gas generator used in the airbag apparatus for the passenger side is typically embedded in a dashboard, the gas generator has a housing of a cylindrical shape that is elongated in the axial direction. DE-A No. 4005768, JP-A No. 6-227357 and JP-A No. 9-226508 disclose a pyrotechnic gas generator having a cylindrical housing elongated in the axial direction.

DE-A No. 4005768 discloses a gas generator 10 including an elongated housing that has an igniter 13 attached to one end portion thereof. The gas generating agent 16 is disposed in both the gas generating agent accommodation space of a comparatively large volume in one end portion of the housing and a smaller-diameter portion formed inside the filter, and a channel 20 of a reduced diameter is formed in the central portion. As a result, the gas generating agent that starts burning from one end of the housing by an ignition device 12 needs some time to burn out to the opposite end. In particular, a reduced diameter channel 20 is formed in the central portion, and such a structure is unsuitable for the propagation and advancement of combustion.

In JP-A No. 6-227357, the ignition ability of a gas generating agent disposed far from an igniter is enhanced by using a flame transfer tube. With this invention, the ignition ability of the gas generating agent disposed far from the igniter can be enhanced, but because the flame transfer tube has to be installed, the loaded amount of the gas generating agent is restricted and the resultant structure is not suitable for size-reducing or increasing the output.

In the structure shown in FIG. 1 of JP-A No. 9-226508, the inside of a cylindrical housing 1 is divided by a hollow cylindrical member 20 into a combustion chamber G having a gas generating agent 4 located therein and a cooling filtration chamber F accommodating a filter 21. The hollow cylindrical member 20 includes a flange portion 20b and a body portion 20e extending inside the filter 21 and having gas passage holes 20a formed therein. The body portion 20e is disposed so as to cover the entire inner side of the filter 21. With the structure described in JP-A No. 9-226508, the inside of the hollow cylindrical member 20 is a space that contains nothing and it is not adapted for downsizing the gas generator. Further, such a structure is not suitable for a gas generator with a high gas discharge amount such as a gas generator for an air bag for a passenger side.

SUMMARY OF THE INVENTION

The present invention relates to a gas generator including:
a cylindrical housing having a gas discharge port and being closed at both ends,
an ignition device attached to one end of the cylindrical housing,
a first gas generating agent chamber provided in the cylindrical housing at a position close to the ignition device and filled with a first gas generating agent,
a cylindrical filter provided in a space axially adjacent to the first gas generating agent chamber,
a second gas generating agent chamber provided inside the cylindrical filter and filled with a second gas generating agent, and
a retainer disposed between the first gas generating agent chamber and the second gas generating agent chamber, the retainer having an annular flat surface and a annular circumferential wall surface that protrudes from an inner circumferential edge of the annular flat surface, the annular flat surface abutting against one end surface of the cylindrical filter and the annular circumferential wall surface abutting against a portion of an inner circumferential surface on one end side of the cylindrical filter,
an inner diameter of the second gas generating agent chamber being smaller than an inner diameter of the first gas generating agent chamber.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
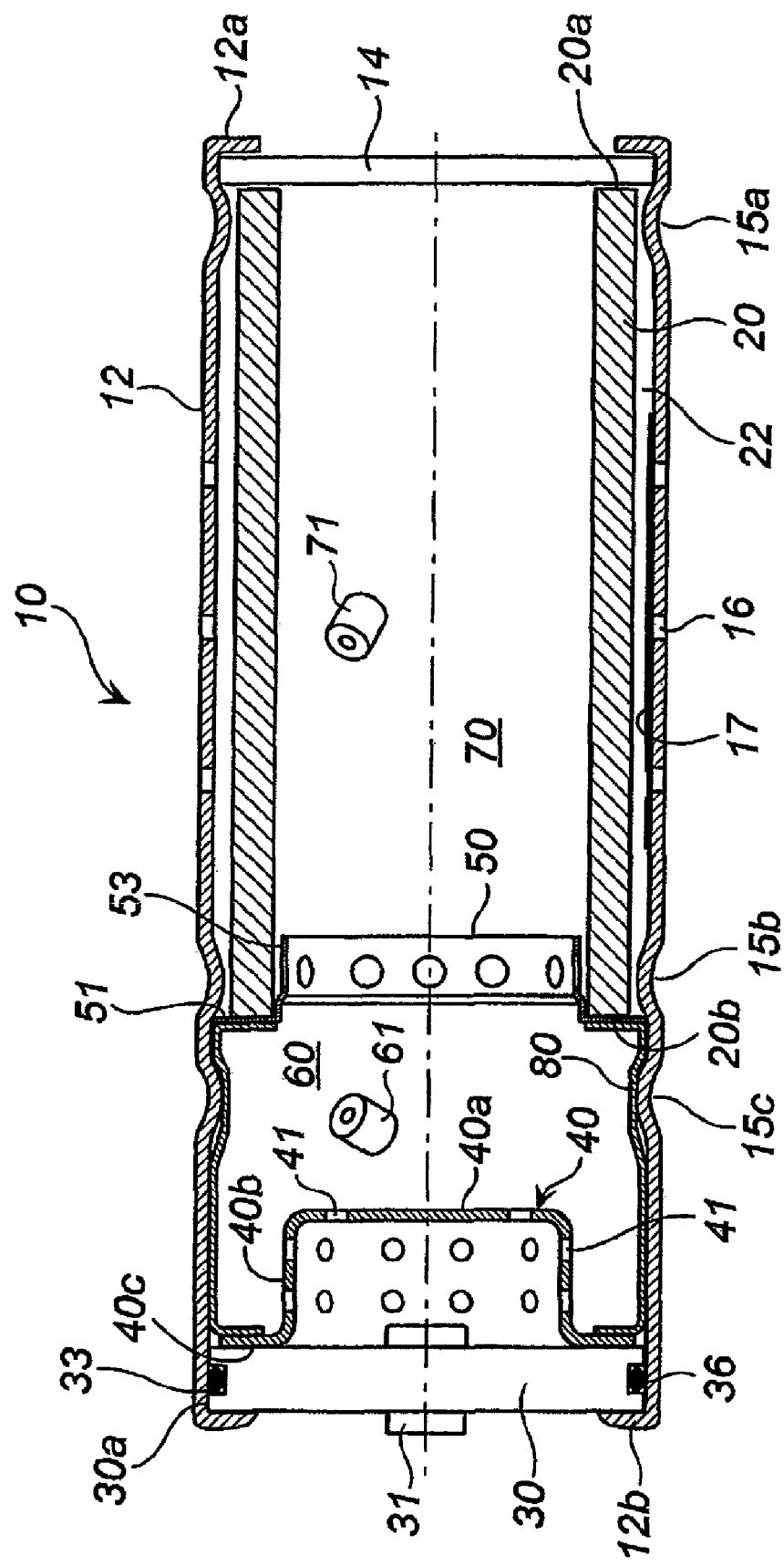
FIG. 1 shows an axial sectional view of the gas generator in accordance with the present invention.

The present invention provides a gas generator having a housing of a cylindrical shape that has good ignition ability of a gas generating agent and also a large gas discharge amount.

In accordance with the present invention, the first gas generating agent chamber filled with the first gas generating agent is located closer to the ignition device, and the second gas generating agent chamber filled with the second gas generating agent is located farther from the ignition device. Further, the inner diameter of the second gas generating agent chamber is smaller than the inner diameter of the first gas generating agent chamber. Therefore, a reduced diameter portion of a smaller diameter is provided between the first gas generating agent chamber and the second gas generating agent chamber.

As a result, when the ignition device (for example, an electric igniter alone or a combination of the electric igniter and a transfer charge) is actuated, first, the first gas generating agent located within the first gas generating agent chamber is combusted, flow velocity of the generated combustion gas is increased under the effect of the reduced diameter portion, and flow thereof into the second gas generating agent chamber is facilitated. As a result, the ignition and combustion of the second gas generating agent located far from the ignition device proceed smoothly even without using the flame transfer tube such as described in JP-A No. 6-227357. Further, the combustion gas generated by combustion of the first gas generating agent and the second gas generating agent passes through the cylindrical filter where it is cooled and filtered and then flows out from a gas discharge port and inflates an airbag. Since the flame transfer tube is not used, the volume of the gas generating agent chambers can be increased and the filling amount of the gas generating agent can be increased.

Further, because the cylindrical filter is disposed in part of the cylindrical housing in the longitudinal direction thereof, the filling amount (that is, the gas discharge amount) of the gas generating agent can be increased, without changing the entire size, compared with the case in which the cylindrical filter is disposed along the entire cylindrical housing in the longitudinal direction thereof.

The present invention preferably relates to the gas generator, wherein the retainer has an annular flat surface and an annular circumferential wall surface, and the annular circumferential wall surface has a larger-diameter circumferential wall surface, which is a portion close to the annular flat surface, and, as the remaining portion, a smaller-diameter circumferential wall surface having a plurality of openings; and the larger-diameter circumferential wall surface abuts against the inner circumferential surface of the cylindrical filter, and a gap is formed between the smaller-diameter circumferential wall surface and the inner circumferential surface of the cylindrical filter.

The smaller-diameter circumferential wall surface of the retainer that supports the cylindrical filter thus has a plurality of openings, and a gap is formed between the smaller-diameter circumferential wall surface and the inner peripheral surface of the cylindrical filter. Therefore, when the combustion gas flows into the filter, the combustion gas also easily flows in from the openings formed in the smaller-diameter circumferential wall surface and the filtration efficiency of the filter is increased.

The gas that thus flows in from the openings formed in the smaller-diameter circumferential wall surface directly passes through the cylindrical filter located in a directly opposite position and is discharged from the gas discharge ports. Therefore, the discharge of the combustion gas can be started earlier and, therefore, the inflation of the airbag can be started earlier than the case in which the entire combustion gas located in the first gas generating agent chamber flows into the second gas generating agent chamber, the second gas generating agent is combusted, and then the entire combustion gas passes through the cylindrical filter and is discharged from the gas discharge port.

Further, because part of the generated gas escapes from the openings formed in the smaller-diameter circumferential wall surface, the pressure inside the housing does not increase excessively. In addition, when the combustion gas moves from the first gas generating agent chamber to the second gas generating agent chamber having the reduced diameter, a load is applied to the filter because the flow velocity of the gas rises, but because the annular flat surface and annular circumferential wall surface of the retainer cover the filter, the filter is prevented from being damaged by the load. End portions of the circumferential surface of the retainer on the side of the second gas generating agent chamber may be cut, and convexities and concavities may be formed therein instead of the openings formed in the smaller-diameter circumferential wall portion.

The present invention preferably relates to the gas generator, wherein the retainer abuts against a cylindrical spacer disposed within the first gas generating agent chamber; and the spacer abuts by one end side thereof against a closing portion of the cylindrical housing and abuts by the other end side thereof against the annular flat surface of the retainer.

Where the retainer abuts against the cylindrical spacer, the fixing operation can be facilitated by comparison with that in which the retainer is fixed independently. Further, the short pass of the combustion gas from between the retainer and the spacer can be prevented.

The present invention preferably relates to the gas generator, wherein the ignition device has an igniter attached to a member closing one end portion of the cylindrical housing and a transfer charge;

the transfer charge is filled in a cup member having a flange portion and covering the igniter, and the flange portion abuts against the closing member; and the retainer abuts against a cylindrical spacer disposed within the first gas generating agent chamber, and the spacer abuts by one end side thereof against the flange portion and abuts by the other end side thereof against the annular flat surface of the retainer.

In this configuration, an electric igniter and a transfer charge are used as a ignition device, and a cup member having a flange portion is used to form a space for accommodating the transfer charge. The retainer, the cylindrical spacer, and the cup member are attached in correlation with each other, whereby the attachment operation of components is facilitated.

The present invention preferably relates to the gas generator, wherein a volume ($V_1$) of the second gas generating agent chamber is larger than a volume ($V_2$) of the first gas generating agent chamber.

Because the volume of the space filled with the gas generating agent can be increased and the filling amount of the gas generating agent can be enlarged, the gas generator is also suitable as a gas generator with a large gas discharge amount, such as a gas generator for an airbag for a passenger side.

The gas generator in accordance with the present invention has a housing of a cylindrical shape, gas ignition ability of the entire gas generating agent is increased, without using a flame transfer tube, and the size of the gas generator can be reduced without decreasing the amount of the gas generating agent.

Figure 2:
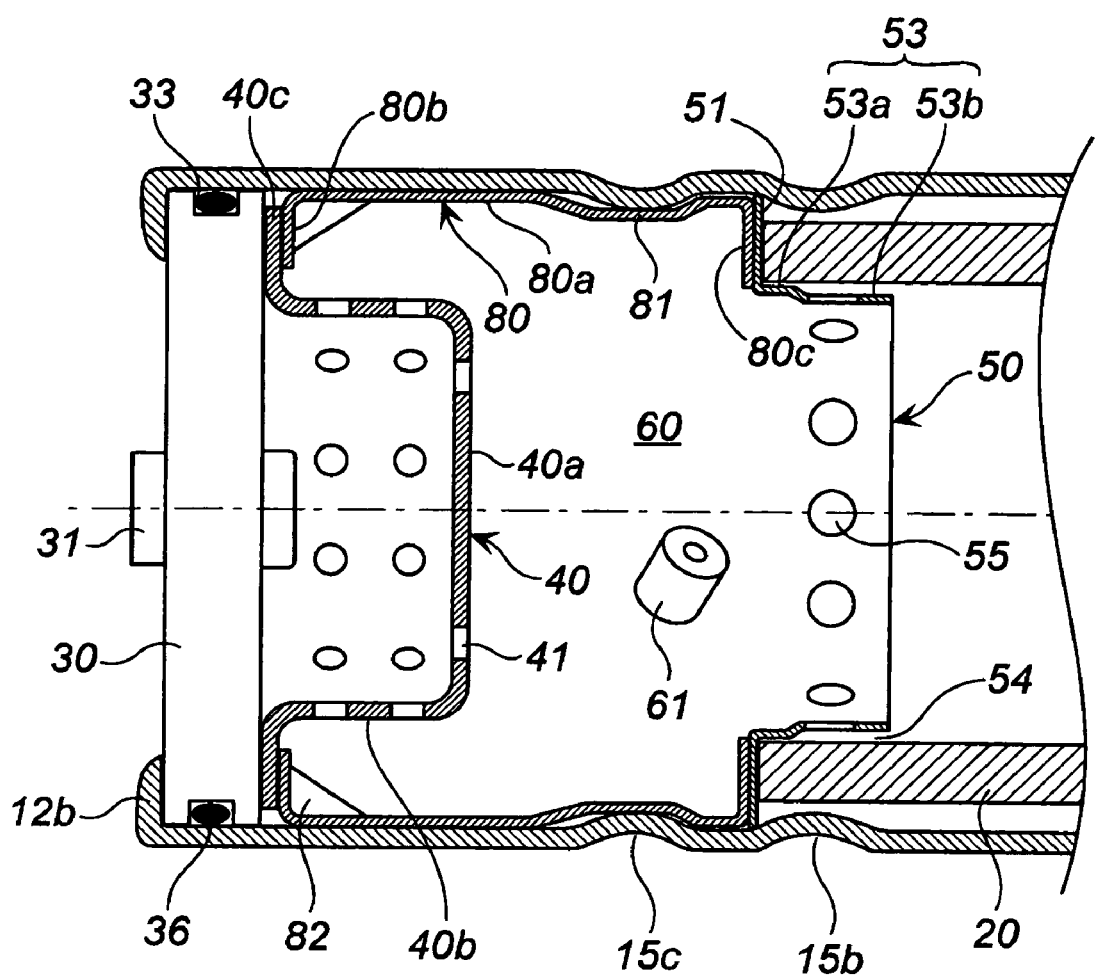
FIG. 2 shows a partial enlarged view of the configuration shown in FIG. 1.

PREFERRED EMBODIMENT OF INVENTION (1) Gas Generator of FIG. 1, FIG. 2

FIG. 1 is an axial sectional view of a gas generator 10 in accordance with the present invention. FIG. 2 is a partial enlarged view of the gas generator shown in FIG. 1. The gas generator shown in FIG. 1 is suitable as a gas generator for an air bag for a passenger side next to the driver.

An opening at one end of a cylindrical housing 12 is closed with a closing member 14. The closing member 14 is fixed by a first protrusion 15a. If necessary, a seal member such as an O-ring may be disposed.

A boss 30 having an igniter 31 attached thereto is disposed in an opening at the other end of the cylindrical housing 12. The igniter is a conventional electric igniter that is attached to the boss 30 by the known method (for example, a method by which the igniter 31 and boss 30 are integrated by a resin). An annular groove 33 is formed in a circumferential wall surface 30a of the boss, and an O-ring 36 is fitted into the groove 33.

A cup-shaped container 40 accommodating a transfer charge is disposed at a surface of the boss 30 on the side of the cylindrical housing 12. The cup-shaped container 40 has a bottom surface 40a, a circumferential wall surface 40b, and a flange 40c extending outwardly in the radial direction from the circumferential wall surface 40b. A plurality of communication holes 41 are formed in the bottom surface 40a and the circumferential wall surface 40b.

The inside of the cup-shaped container 40 is filled with a transfer charge (not shown in the drawing). As the transfer charge, the conventional boron nitrate or a gas generating agent with a comparatively high combustion temperature may be used. The volume of the inner space of the cup-shaped container 40 is about 6 ml, and this space is filled with 6 g of a gas generating agent with a comparatively high combustion temperature that is described in JP-A No. 2005-199867.

A plurality of gas discharge ports 16 are formed in the circumferential wall surface of the cylindrical housing 12 and closed from the inner side with a seal tape 17.

A cylindrical filter 20 is disposed inside the cylindrical housing 12 so as to face the gas discharge ports 16. A gap 22 is formed between the cylindrical filter 20 and the inner wall surface of the housing 12. A first end surface 20a of the cylindrical filter 20 abuts against the closing member 14.

A space inside the cylindrical housing 12 in which the igniter 31 is disposed (space where the cylindrical filter 20 is not disposed) is a first gas generating agent chamber 60, and a space surrounded by the cylindrical filter 20 (in the axial direction, from the closing member 14 to a second end surface 20b of the filter) is a second gas generating agent chamber 70. The first gas generating agent chamber 60 is filled with a first gas generating agent 61, and the second gas generating agent chamber 70 is filled with the second gas generating agent 71.

A retainer 50 is disposed at the side of the second end surface 20b of the cylindrical filter 20. The retainer 50 has an annular flat surface 51 and an annular circumferential wall surface 53 protruding from the inner circumferential edge of the annular flat surface 51. As shown in FIG. 2, the annular circumferential wall surface 53 includes a larger-diameter circumferential wall surface 53a, which is a portion close to the annular flat surface 51, and a smaller-diameter circumferential wall surface 53b which is the remaining portion of the annular circumferential wall surface 53 and has a plurality of openings 55. The length of the annular circumferential wall surface 53 is about 12 mm.

In the retainer 50, the annular flat surface 51 abuts against the second end surface 20b of the cylindrical filter 20, the larger-diameter circumferential wall surface 53a abuts against the inner peripheral surface of the cylindrical filter 20, and a gap 54 is obtained between the smaller-diameter circumferential wall surface 53b and the inner circumferential surface of the cylindrical filter 20. The openings 55 of the smaller-diameter circumferential wall surface 53b are 12 orifices having a diameter of 3 mm that are opened equidistantly in positions directly facing the gap 54.

The length of the annular circumferential wall surface 53 of the retainer is preferably 10 to 30%, more preferably 10 to 20% the length of the cylindrical filter 20. Where such a range requirement is satisfied, the ignition ability of the second gas generating agent 71 can be enhanced, and the pressure inside the housing can be prevented from increasing excessively when the gas generator is actuated.

The inner diameter of the first gas generating agent chamber 60 (diameter of the portion that is in contact with the second end surface 20b) ($d_1$) and the inner diameter of the second gas generating agent chamber 70 (=inner diameter of the cylindrical filter) ($d_2$) satisfy the relationship $d_1 > d_2$. The $d_2/d_1$ ratio is not particularly limited, but a range of 0.95 to 0.50 is preferred. In a configuration in which only the cylindrical filter 20 is present, the combustion gas passes the second end surface 20b and is discharged from the gas discharge ports 16, but when the retainer 50 is disposed, the discharge through this path is prevented by the annular flat surface 51 (short-pass preventing action).

The first gas generating agent chamber 60 has a volume of 24 ml and is filled with 24 g of the first gas generating agent 61 having a low combustion temperature that is described in JP-A No. 2005-199867. The second gas generating agent chamber 70 is filled with 60 g of the second gas generating agent 71 that is identical to the first gas generating agent 61. The length of space inside the cylindrical housing 12 (length from the closing member 14 to the boss 30) can be about four times larger than the length of the first gas generating agent chamber 60.

A cylindrical spacer 80 that supports the retainer 50 is disposed in the first gas generating agent chamber 60. The spacer 80 has a circumferential wall portion 80a and also a first annular flat-plate portion 80b and a second annular flat-plate portion 80c that are obtained formed by bending inwardly the opening portions at both ends. An annular concave portion 81 is formed in part of the circumferential wall portion 80a, and a rib 82 for reinforcement is formed between the circumferential wall portion 80a and the first annular flat-plate portion 80b. The rib may also be formed between the circumferential wall portion 80a and the second annular flat-plate portion 80c.

A major portion of the circumferential wall portion 80a abuts against the inner circumferential surface of the cylindrical housing 12, the first annular flat-plate portion 80b abuts against the flange 40c of the cup-shaped container 40, and the second annular flat-plate portion 80c abuts against the annular flat surface 51 of the retainer. A gap between the annular flat surface 51 of the retainer and the flange 40c of the cup-shaped container 40 is about 27 mm.

A method for attaching and fixing the retainer 50, the spacer 80, and the cup-shaped container 40 will be described below.

The retainer 50 and spacer 80 are inserted into the cylindrical housing 12 to predetermined positions by using a jig and then fixed by forming a second protrusion 15b and a third protrusion 15c.

Then, the cup-shaped container (filled with the transfer charge) 40 and the boss 30 having the igniter 31 attached thereto are disposed so that first annular flat-plate portion 80b of the spacer 80 and the flange 40c overlap, and then crimped portion 12b is formed to fix the retainer 50 and spacer 80. In this state, the retainer 50 and spacer 80 are pressed in the axial direction. Therefore, the annular flat surface 51 and second annular flat-plate portion 80c are press-contacted with each other. As a result, the combustion gas does not leak from the contact portion of the annular flat surface 51 and the second annular flat-plate portion 80c (short-pass preventing action). In addition, a state is assumed in which the third protrusion 15c is engaged with the annular concave portion 81, thereby preventing the spacer 80 from being loose.

The filter 20 is then inserted into the cylindrical housing 12 having the first protrusion 15a formed therein. The gas generating agents 61, 71 are then loaded, the closing member 14 is brought into contact with the first protrusion 15a, and a crimped portion 12a is formed in this state. Where a filter compressible in the axial direction is used as the filter 20, both end portions 20a, 20b thereof are press-contacted with the closing member 14 and the annular flat surface 51 of the retainer when the crimped portion 12a is formed. Therefore, a short-pass from the contact surface thereof is prevented.

The operation of the gas generator shown in FIG. 1 and FIG. 2 will be explained below. The transfer charge located inside the cup-shaped container 40 is combusted by the actuation of the igniter 31. In this case, the combustion products (high-temperature gas, flame) pass via the communication holes 41 and ignite the first gas generating agent 61 loaded into the first gas generating agent chamber 60. The communication holes 41 are formed in the bottom surface 40a and circumferential wall surface 40b of the cup-shaped container 40, and the first gas generating agent 61 is ignited and combusted at once.

The high-temperature gas and flame generated by combustion of the first gas generating agent 61 pass through a portion reduced in diameter by the retainer 50, enter the second gas generating agent chamber 70, and ignite the second gas generating agent 71 located therein.

In this case, the flow velocity of the high-temperature gas and flame flowing into the space inside the filter is increased by the reduced-diameter portion formed by the retainer 50. Because of this and also under the action of the annular circumferential wall surface 53 of the retainer, the high-temperature gas flow can be forced to be introduced into the second gas generating agent chamber 70. Therefore, the second gas generating agent 71 located on the side of the closing member 14 is also easily combusted and consumed within a short interval. Although the flow velocity of the combustion gas increases in the portion reduced in diameter by the retainer 50, because the retainer 50 acts as a cover protecting the second end surface 20b of the filter, the filter 20 is prevented from being thermally damaged by the increase in flow velocity.

On the other hand, because the annular circumferential wall surface 53 of the retainer is not too long, part of the combustion gas of the first gas generating agent 61 is discharged from the filter 20 via the openings 55 and from the gas discharge ports 16 via the gap 22, without proceeding to the side of the closing member 14, thereby inhibiting the excess increase in the pressure inside the housing. In particular, because the openings 55 are formed in the smaller-diameter circumferential wall surface 53b, and the gap 54 is formed between the smaller-diameter circumferential wall surface and the filter 20, the combustion gas can pass through almost the entire portion of the filter 20, and the cooling efficiency and filtering efficiency of the filter are maintained.

As a result of the above-described operations, the following operational effects can be obtained:
  (i) The increase in pressure inside the housing can be inhibited;
  (ii) Filtering and cooling efficiency of the filter can be maintained at a high level;
  (iii) The gas generating agent in a location far from the ignition device can be ignited and combusted even without using the conventional flame transfer tube; and
  (iv) Because the flame transfer tube is not used, the internal volume of the housing is increased and the filling amount of the gas generating agent can be increased. As a result, the configuration can be adapted to a gas generator that requires a large-volume airbag and a high output power.

Figure 3:
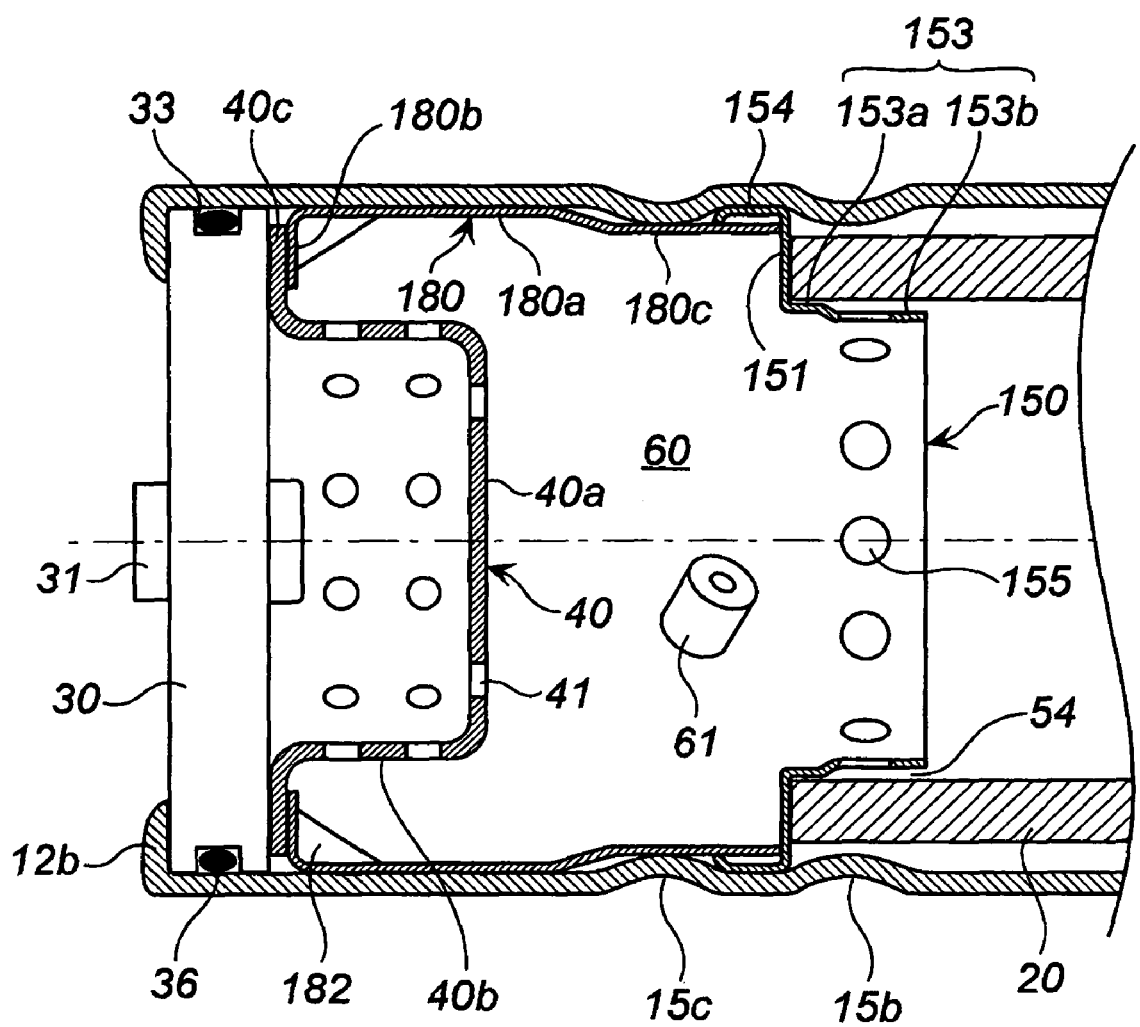
FIG. 3 shows a partial enlarged view equivalent of FIG. 2 of another embodiment.

(2) Gas Generator Shown in FIG. 3

A gas generator of another embodiment will be explained with reference to FIG. 3. FIG. 3 illustrates a view equivalent to that of FIG. 2 and shows a gas generator identical to that shown in FIG. 1, except that the retainer and the spacer are different.

A retainer 150 has an annular flat surface 151, an inner annular circumferential wall surface 153 provided to protrude from the inner circumferential edge of the annular flat surface 151, and an outer annular circumferential wall surface 154 provided to protrude from the external circumferential edge of the annular flat surface 151 in the opposite direction to the wall surface 153. The inner annular circumferential wall surface 153 has a larger-diameter circumferential wall surface 153a in the portion close to the annular flat surface 151 and a smaller-diameter circumferential wall surface 153b having a plurality of openings 155 as the remaining portion.

In the retainer 150, the annular flat surface 151 abuts against the second end surface 20b of the cylindrical filter 20, the larger-diameter circumferential wall surface 153a abuts against the inner peripheral surface of the cylindrical filter 20, and a gap 54 is formed between the smaller-diameter circumferential wall surface 153b and the inner circumferential surface of the cylindrical filter 20. The outer annular circumferential wall surface 154 abuts against the inner circumferential surface of the cylindrical housing 12. The openings 155 of the smaller-diameter circumferential wall surface 153b are in positions directly facing the gap 54.

A cylindrical spacer 180 that supports the retainer 150 is disposed in the first gas generating agent chamber 60. The spacer 180 has a larger-diameter circumferential wall portion 180a, a smaller-diameter circumferential wall portion 180c, and a first annular flat-plate portion 180b that is formed by bending inwardly the opening portion at the side of the boss 30. A rib 182 for reinforcement is formed between the larger-diameter circumferential wall portion 180a and the first annular flat-plate portion 180b.

The larger-diameter circumferential wall portion 180a abuts against the inner circumferential wall surface of the cylindrical housing 12, the first annular flat-plate portion 180b abuts against the flange 40c of the cup-shaped container 40, and the circumferential edge of the opening on the other side abuts against the annular flat surface 151 of the retainer.

The cylindrical filter 20, the retainer 150, the spacer 180, and the cup-shaped container 40 are pressed in the axial direction and radial direction by the crimped portions 12a, 12b, the first protrusion 15a, the second protrusion 15b, and the third protrusion 15c, in the same manner as the components shown in FIG. 1, FIG. 2. Therefore, they are press-contacted with each other and fixed.

Figure 4:
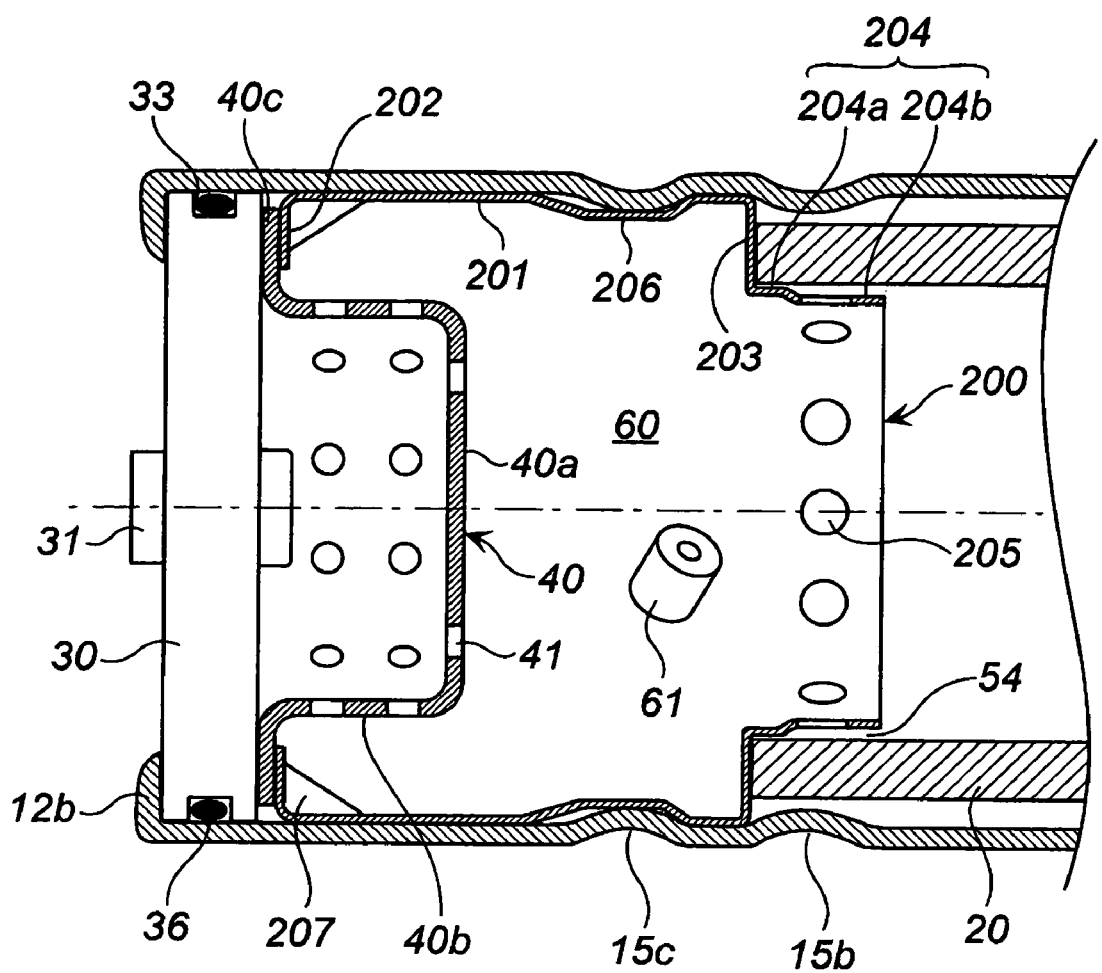
FIG. 4 shows a partial enlarged view equivalent of FIG. 2 of still another embodiment.

(3) Gas Generator Shown in FIG. 4

A gas generator of still another embodiment will be explained with reference to FIG. 4. FIG. 4 illustrates a view equivalent to that of FIG. 2 and shows a gas generator identical to that shown in FIG. 1, except that the retainer is different in that the retainer and spacer shown in FIG. 1 are formed integrally.

A retainer 200 has as a whole a cylindrical shape obtained by integrating the retainer 50 and spacer 80 shown in FIG. 1.

The retainer 200 has a cylindrical circumferential wall portion 201, a first annular flat-plate portion 202 formed by bending inwardly an opening portion at one end of the cylindrical circumferential wall portion 201, a second annular flat-plate portion 203 formed by bending inwardly an opening portion at the other end of the cylindrical circumferential wall portion 201, and an annular circumferential wall surface 204 provided to protrude from the inner circumferential edge of the second annular flat-plate portion 203.

The annular circumferential wall surface 204 includes a larger-diameter circumferential wall surface 204a, which is a portion close to the second annular flat-plate portion 203, and a smaller-diameter circumferential wall surface 204b which is the remaining portion of the annular circumferential wall surface and has a plurality of openings 205. An annular concave portion 206 is formed in part of the cylindrical circumferential wall portion 201, and a rib 207 for reinforcement is formed between the cylindrical circumferential wall portion 201 and the first annular flat-plate portion 202.

In the retainer 200, the second annular flat-plate portion 203 abuts against the second end surface 20b of the cylindrical filter 20, the larger-diameter circumferential wall surface 204a abuts against the inner peripheral surface of the cylindrical filter 20, and a gap 54 is formed between the smaller-diameter circumferential wall surface 204b and the inner circumferential surface of the cylindrical filter 20. The openings 205 of the smaller-diameter circumferential wall surface 204b are opened in positions directly facing the gap 54. The first annular flat-plate portion 202 abuts against the flange 40c of the cup-shaped container 40, and the major portion of the cylindrical circumferential wall portion 201 abuts against the inner wall surface of the cylindrical housing 12.

The cylindrical filter 20, the retainer 200, and the cup-shaped container 40 are pressed in the axial direction and the radial direction by the crimped portions 12a, 12b, the first protrusion 15a, the second protrusion 15b, and the third protrusion 15c, in the same manner as the components shown in FIG. 1, FIG. 2. Therefore, they are press-contacted with each other and fixed. Further, forming the second protrusion 15b somewhat deeper or into a rectangular shape facilitates the abutment of the second annular flat-plate portion 203 of the retainer, thereby making it possible not to form the third protrusion 15c or annular concave portion 206.

The invention thus described, it will be obvious that the same may be varied in many ways. Such variations are not regarded as a departure from the spirit and scope of the invention, and all such modification as would be obvious to one skilled in the art are included within the scope of the following claims.

The invention claimed is:

1. A gas generator, comprising:
    a cylindrical housing having a gas discharge port and being closed at a first end and a second end opposite to the first end;
    an ignition device attached to the first one-end of the cylindrical housing;
    a first gas generating agent chamber defined inside the cylindrical housing at a position closer to the first end and filled with a first gas generating agent,
    a cylindrical filter provided in a space defined inside the cylindrical housing at a position closer to the second end;
    a second gas generating agent chamber defined by an inner circumferential surface of the cylindrical filter and filled with a second gas generating agent; and
    a retainer disposed between the first gas generating agent chamber and the second gas generating agent chamber, the retainer having an annular flat surface and an annular circumferential wall surface that protrudes from an inner circumferential edge of the annular flat surface, the annular flat surface abutting against an entire surface of one end of the cylindrical filter and the annular circumferential wall surface abutting against a portion of the inner circumferential surface at one end side of the cylindrical filter,
    an inner diameter of the second gas generating agent chamber being smaller than an inner diameter of the first gas generating agent chamber.

2. The gas generator according to claim 1, wherein
    the annular circumferential wall surface has a larger-diameter circumferential wall surface, at a portion close to the annular flat surface, and, as the remaining portion, a smaller-diameter circumferential wall surface having a plurality of openings, and
    the larger-diameter circumferential wall surface abuts against the inner circumferential surface of the cylindrical filter, and a gap is formed between the smaller-diameter circumferential wall surface and the inner circumferential surface of the cylindrical filter.

3. The gas generator according to claim 2, wherein a volume (V1) of the second gas generating agent chamber is larger than a volume (V2) of the first gas generating agent chamber.

4. The gas generator according to claim 1, further comprising:
    a cylindrical spacer disposed within the first gas generating agent chamber, wherein
    one end side of the spacer abuts against a closing portion at the first end of the cylindrical housing, and the other end side of the spacer abuts against the annular flat surface of the retainer.

5. The gas generator according to claim 4, wherein the retainer has an outer annular circumferential wall surface that protrudes from an outer circumference of the annular flat surface in a direction of the first end of the cylindrical housing.

6. The gas generator according to claim 5, wherein an end portion of the spacer in a vicinity of the other end side overlaps the outer annular circumferential wall surface of the retainer.

7. The gas generator according to claim 1, wherein
    the ignition device includes an igniter attached to a member closing one end portion of the cylindrical housing, and a transfer charge;
    the gas generator, further comprising:
    a cup member that accommodates the transfer charge and covers the igniter, the cup member having a flange portion that abuts against the closing member; and
    a cylindrical spacer disposed within the first gas generating agent chamber, wherein
    the spacer abuts at one end side thereof against the flange portion and abuts at the other end side thereof against the annular flat surface of the retainer.

8. The gas generator according to claim 1, wherein a volume (V1) of the second gas generating agent chamber is larger than a volume (V2) of the first gas generating agent chamber.

9. The gas generator according to claim 1, wherein the annular circumferential wall surface protrudes in a direction of the second end of the cylindrical housing.

10. The gas generator according to claim 1, further comprising:
    a cylindrical spacer disposed within the first gas generating agent chamber, one end side of the spacer abutting against a closing portion at the first end of the cylindrical housing,
    wherein, the cylindrical spacer extends from an outer circumference of the annular flat surface of the retainer in a direction of the first end of the cylindrical housing, and
    the cylindrical spacer and the retainer are formed of a single-piece material.

* * * * *